United States Patent
Hudec

(10) Patent No.: US 10,326,329 B2
(45) Date of Patent: Jun. 18, 2019

(54) CANNED MOTOR HAVING A HIGH-PRESSURE-RESISTANT CAN

(71) Applicant: Rausch & Pausch GmbH, Selb (DE)

(72) Inventor: Julius Hudec, As (CZ)

(73) Assignee: Rausch & Pausch GmbH, Selb (DE)

( * ) Notice: Subject to any disclaimer, the term of this patent is extended or adjusted under 35 U.S.C. 154(b) by 895 days.

(21) Appl. No.: 14/471,076

(22) Filed: Aug. 28, 2014

(65) Prior Publication Data

US 2015/0061437 A1 Mar. 5, 2015

(30) Foreign Application Priority Data

Sep. 2, 2013 (DE) .......................... 10 2013 109 522

(51) Int. Cl.
*H02K 5/128* (2006.01)

(52) U.S. Cl.
CPC ..... *H02K 5/128* (2013.01); *H02K 2005/1287* (2013.01); *H02K 2213/03* (2013.01)

(58) Field of Classification Search
CPC ........... H02K 5/128; H02K 2005/1287; H02K 2213/03; H02K 3/487; H02K 5/1285
USPC ..... 310/85, 86, 87, 88, 89, 43, 44, 214, 215
See application file for complete search history.

(56) References Cited

U.S. PATENT DOCUMENTS

| | | | | |
|---|---|---|---|---|
| 2,698,911 A * | 1/1955 | Schaefer | .............. | H02K 5/1285 310/86 |
| 3,740,598 A * | 6/1973 | Hallerback | ............ | H02K 5/128 310/86 |
| 3,869,629 A * | 3/1975 | Ogawa | ................... | H02K 1/165 310/216.069 |
| 4,227,108 A * | 10/1980 | Washizu | .................. | H02K 1/04 310/214 |
| 5,931,511 A * | 8/1999 | DeLange | .............. | E21B 17/042 285/333 |

(Continued)

FOREIGN PATENT DOCUMENTS

| | | |
|---|---|---|
| DE | 10232389 A1 | 2/2004 |
| DE | 102010011316 A1 | 9/2011 |

(Continued)

OTHER PUBLICATIONS

English translation of EP 2365614; Herr et al.; Sep. 2011.*

(Continued)

*Primary Examiner* — Bernard Rojas
*Assistant Examiner* — Ahmed Elnakib
(74) *Attorney, Agent, or Firm* — Maier & Maier, PLLC

(57) ABSTRACT

A pump having a canned motor which has a stator with an internal rotor disposed therein, the stator and the internal rotor being mutually separated fluid-tightly by a can disposed between stator and internal rotor, the stator having stator teeth which extend radially in the direction of the internal rotor and define with appurtenant stator-tooth end faces a receiving space for the internal rotor and the can, the can lying against the stator-tooth end faces, the can having on its surface facing the stator, in stator-tooth gaps which are respectively defined by two mutually adjacent stator teeth, ribs fitted in in a form-locking manner which taper in the radial direction, starting out from a rib root disposed on the can, with regard to a rib thickness defined in the circumferential direction of the can.

15 Claims, 4 Drawing Sheets

(56) References Cited

U.S. PATENT DOCUMENTS

| | | | | |
|---|---|---|---|---|
| 5,990,588 A * | 11/1999 | Kliman | .................. | H02K 3/493 |
| | | | | 310/86 |
| 6,984,909 B2 * | 1/2006 | Kadoya | .................. | H02K 1/146 |
| | | | | 310/185 |
| 2003/0230950 A1 * | 12/2003 | Reimann | ................ | H02K 5/128 |
| | | | | 310/192 |
| 2010/0295403 A1 * | 11/2010 | Morita | ................... | H02K 1/146 |
| | | | | 310/156.78 |
| 2011/0033321 A1 * | 2/2011 | Mikkelsen | ........... | H02K 5/1285 |
| | | | | 417/410.1 |
| 2013/0119818 A1 * | 5/2013 | Lee | ........................ | H02K 29/03 |
| | | | | 310/216.106 |

FOREIGN PATENT DOCUMENTS

| | | | |
|---|---|---|---|
| EP | 1376822 A1 | | 1/2004 |
| JP | 2006067729 | * | 3/2006 |
| JP | 2009-284704 A | | 12/2009 |

OTHER PUBLICATIONS

English translation of JP 2009284704; Dec. 2009; Hirata et al.*
Electrical resistivity and conductivity—Wikipedia.*
European Search Report dated Nov. 6, 2015, in connection with EP Application No. 14 18 2408 (1 pg.).

* cited by examiner

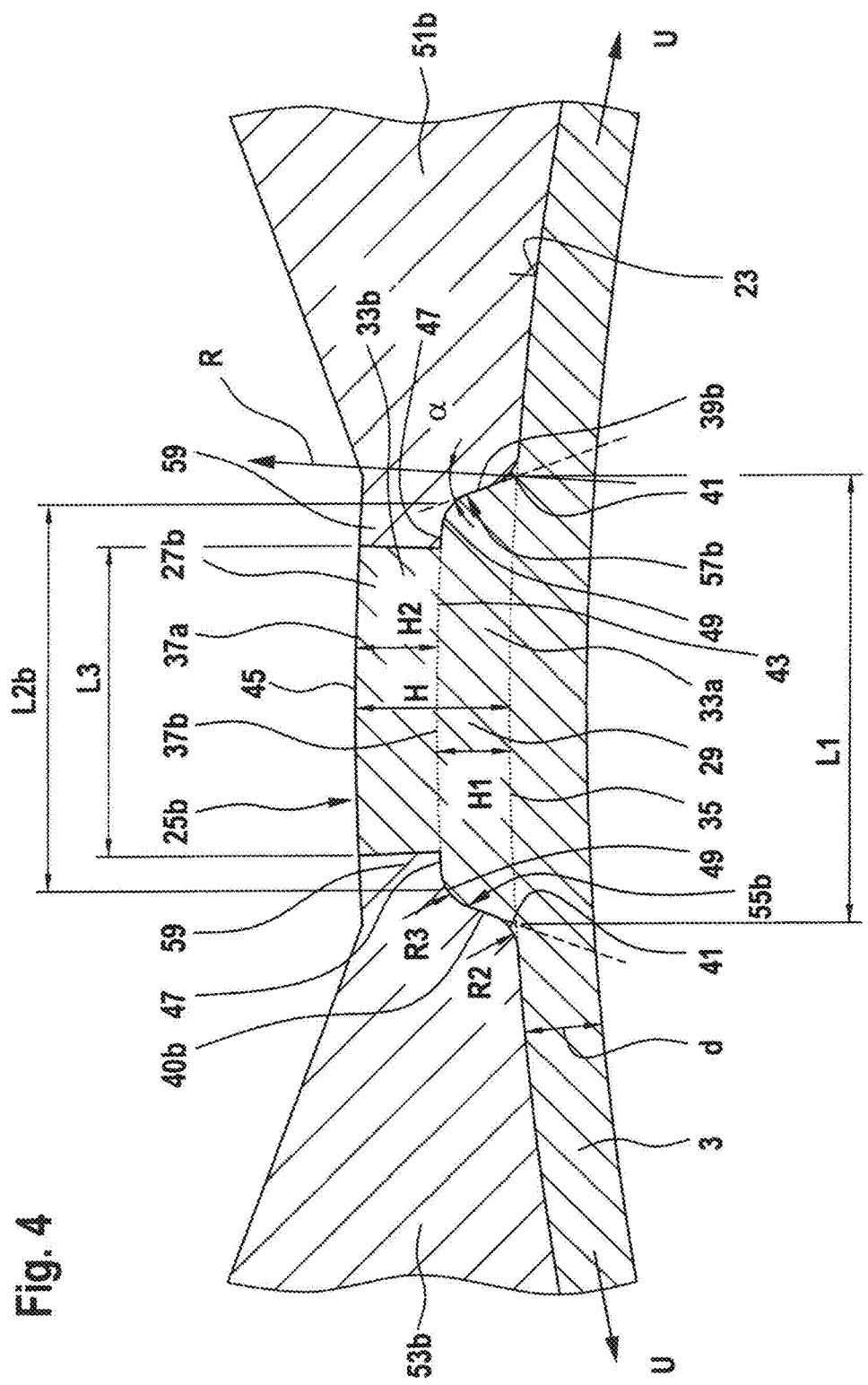

CANNED MOTOR HAVING A HIGH-PRESSURE-RESISTANT CAN

BACKGROUND

This invention relates in general to canned motors. In particular, the invention relates to a pump having a canned motor which has a stator with an internal rotor disposed therein, the stator and the internal rotor being mutually separated fluid-tightly by a can disposed between stator and internal rotor, the stator having stator teeth which extend radially in the direction of the internal rotor and define with appurtenant stator-tooth end faces a receiving space for the internal rotor and the can, and the can lying against the stator-tooth end faces.

A canned motor is a particular embodiment of a wet-rotor motor, in which the winding of the stator is protected against the pumped medium by a cylindrical, maximally thin-walled tube made of high-grade steel or plastic within the air gap between stator and rotor of the motor. The performance range of such motors lies between a few watts up to about 2,000 kW. Canned motors are preferably used in pump units.

EP 0 844 723 A2 shows for example a pump having a generic canned motor. The space within which the stator is disposed and the space within which the rotor is disposed are mutually separated fluid-tightly by a can made of plastic. So that the can may be designed with as small a wall thickness as possible, the can is so dimensioned that it lies against the inner side of the stator and is supported by the stator against internal pressure.

The material thickness of the can cannot be increased arbitrarily in order to design the pump for higher operating pressures, since this would likewise accordingly increase the air gap between rotor and stator and thus cause lower energy density in the working air gap and higher stray field losses. Hence, cans made of plastic involve the problem that at high operating pressures, such as for example in the range of 150 bar to 300 bar and higher, the radial pressure load on the can is so high at points not supported by the stator that the plastic is plastically deformed and tears or is sheared off. As a result, pumped medium penetrates into the region of the stator windings and damages the winding of the stator. The stated pressure load is no problem in comparable wet-rotor pump units having a high-pressure-resistant can made of metal, but the eddy-current and magnetic-field losses in such a can amount to up to several hundred watts, depending on the performance category of the motor.

From DE 10 2012 011 316 A1 there is known a canned motor in which the winding of the stator is executed as a tooth coil winding and T-shaped support elements are provided in the winding grooves, with a vertical part of the support elements mutually insulating adjacent windings within a winding groove and mechanically supporting the support element on the ground of the groove. Similar supported cans are also known from DE 2 101 672 A and JP 2006-067 729 A.

From DE 102 32 389 A1 there is known a canned motor in which a plastic sleeve is supported by the stator such that it may be loaded at high internal pressure hydraulically, and the motor inductance may be changed. With a stator having pole shoes, filler pieces consisting of layers of electrically insulated sheets are disposed between the pole shoes such that they are interconnected so as to form a closed bore which serves as a support for the plastic sleeve.

SUMMARY

It is hence a possible object of the present invention to propose a canned motor that overcomes the disadvantages from the prior art. In particular, it is an object of the invention to propose a canned motor that is suitable for use at high pumping pressures, but requires no metallic can so as to avoid eddy-current and magnetic-field losses in the can.

At least one of the objects is achieved with the features of the independent claims. Further features and details of the invention may be found in the subclaims, the description and the drawings.

The central idea of the invention is to locally reinforce and shape a can made of a material having low electrical conductivity, preferably made of a plastic, at points with high operating pressure load, substantially at points where two respectively adjacent stator teeth forms a gap (stator-tooth gap), such that the equivalent stresses (fictitious uniaxial stress representing the same material stressing as the real, multiaxial stress state) in the can material always remain below the breaking point of the employed can material particularly at these points at the intended working pressure during operation of the motor. Thus, plastics can in principle be employed as can materials instead of metal. For better illustration, equivalent stresses are stated here in order to permit a direct comparison of the real three-dimensional loading state in the component, consisting of normal stresses and shear stresses in all three spatial directions, with the characteristic values from the uniaxial tensile test (material characteristics).

Through the material reinforcement according to the invention, sufficient can material is wedged into the respective stator-tooth gap under pressure load to perform substantially two functions. Firstly, the wedging or support forms two defined bearing points fixed against shearing-off on mutually opposing (circumferentially adjacent) metallic stator teeth. Secondly, there is impressed a relieving reaction force, which is acting against the bending stress, is generated by the internal pressure and comes from these bearing points. As a result, the bearing points formed by the mutually opposing metallic stator teeth ensures, alongside the stator-tooth end faces, an additional support for the can on the stator-tooth gaps as points in danger of overload. The can is self-supporting in the region of the stator-tooth gaps.

According to the invention, the material reinforcement with the wedge effect is obtained for example by suitably shaped ribs extending substantially axially on the outer side of the can. The course of the ribs on the can is substantially such, according to the invention, that in the mounted position, i.e. when the can is disposed within the air gap between internal rotor and stator, the ribs become wedged in a form-locking manner in gaps formed by two respectively adjacent stator teeth (stator-tooth gaps). This is obtained substantially by the design of the course of the rib flanks. The simplest design of the rib profile here is a trapezoid form, which comes closest to a wedge. Since the contour of the stator tooth heads is to be shaped complementarily thereto, a simple geometrical form is preferred here from the point of view of the manufacturing process for the stator. However, the course of the contour of the stator tooth heads could in principle be of arbitrarily complicated design and consist for example of one or more geometrical forms such as elliptical course, circular course, exponential course or the like, as long as it is thereby achieved that the rib flanks prevent the rib from slipping into the stator-tooth gap. In terms of the manufacturing process, an approximately trapezoidal course is hence preferred.

In addition, one or more steps may also be provided in the course of the rib flanks in order to obtain an additional form-locking support of the ribs on the stator tooth heads as bearing points.

For sufficient can material in the form of the ribs to become wedged in the gaps between adjacent stator teeth under pressure load in order to obtain the additional support of the can at these points in danger of overload, the rib height is dimensioned sufficiently, besides the substantially wedge-shaped shaping of the axial cross-sectional profile of the ribs. The stator-tooth contour in contact with the rib flanks is accordingly shaped complementarily thereto over the region of the required rib height. In other words, the corresponding design of the stator-tooth contour ensures that the ribs are so high that the can material can only be deflected under operating pressure load from the interior of the can so far that the equivalent stresses in the can material are always smaller than the breaking point of the can material in the total region of the can, particularly in the region of the stator-tooth gaps. That is to say, the ribs do not serve as support elements for support on the ground of the respective stator-tooth gap as in DE 10 2012 011 316 A1. The ribs are supported solely via the rib flanks on the stator tooth heads as bearing points. As a result, the can according to the invention is self-supporting in the region of the stator-tooth gaps.

The material reinforcement according to the invention thus solves the problem existing in the prior art for cans made of plastic. In a conventional can without the ribs according to the invention, can material that cannot be supported by a stator tooth on account of the stator-tooth gap would be expanded outwardly, i.e. into the gap, urged (extruded) through the stator-tooth gap and finally sheared off on the flanks of the stator teeth.

As a development, through a special shaping of the flanks of the ribs the expansive forces in the can material that arise at these points during operation are transmitted around the respective stator-tooth contour (or pole-tooth contour) on the respective stator-tooth gap as bending stresses without local overloads.

A canned motor having a can made of plastic can thus be improved with regard to high-pressure capability, since shearing-off of the can on the stator teeth as well as an extrusion of the plastic through the stator-tooth gap under pressure load are prevented.

A canned motor improved according to the invention obtains the following advantages. In a wet-rotor unit having a high-pressure-resistant can a higher efficiency is in principle obtained compared to conventional units having a metallic can. On account of lower eddy-current and magnetic-field losses less waste heat arises during operation of the unit. Also, the unit is more favorable with regard to manufacturing costs, since a can made of plastic is less expensive than one made of metal. A further advantage consists in the variable possibilities of manufacture. Thus, the can according to the invention may be manufactured individually as an injection-molded part or be directly molded onto the stator as a molded-on part by overmolding. In the latter case, an accurately fitting form-locking form of the ribs into the stator-tooth gaps is automatically ensured.

That is to say, a pump according to the invention has a canned motor which has a stator with an internal rotor disposed therein, the stator and the internal rotor being mutually separated fluid-tightly by a can disposed between stator and internal rotor. The stator has stator teeth which extend radially in the direction of the internal rotor and define with appurtenant stator-tooth end faces a receiving space for the internal rotor and the can. The can lies against the stator-tooth end faces for support. According to the invention, the can has on its surface facing the stator, at stator-tooth gaps which are respectively defined by two mutually adjacent stator teeth, ribs fitted into the stator-tooth gaps in a form-locking manner, which taper in the radial direction, starting out from a rib root disposed on the can, with regard to a rib thickness defined in the circumferential direction of the can, i.e. the height of the ribs (rib height). A stator tooth further consists respectively of a stator tooth shank and a stator tooth head having two stator-tooth-head members. The stator-tooth-head members respectively protrude beyond the appurtenant stator tooth shank in a circumferential direction of the can. Rib flanks formed by side lines of the ribs are respectively in contact, over the region of the rib height, with a contour of the stator-tooth-head members which is shaped complementarily to the side lines, as bearing points fixed against shearing-off. That is to say, the rib height may be accordingly limited. The stator-tooth contour and thus the height of the ribs is so designed that equivalent stresses in the can are always smaller than the breaking point of the can material in the total region in the can under operating pressure load.

The height of the ribs starting out from the rib root is preferably configured to be greater than the wall thickness of the can. The can preferably has a wall thickness of 0.1 mm to 2.0 mm, depending on pressure load and motor dimension. The rib preferably has a height of 0.1 mm to 4 mm.

A particularly preferred cross-sectional profile of the ribs may, in a first embodiment, have at least one trapezoidal portion with a first base line and a first roof line. The first base line lying against the can and extending in the circumferential direction of the can has a first length of preferably 0.8 mm to 5.0 mm. The first roof line disposed in the stator-tooth gap has a shorter second length of preferably 0.25 mm to 3 mm.

The cross-sectional profile of the trapezoidal portion may further be determined by two side lines extending mutually symmetrically and substantially straight. The side lines preferably extend respectively at an angle in the range of 5 degrees to 60 degrees with regard to the radius of the can. To achieve the wedge effect, the side lines extend inwardly, starting out from the rib root, so that the rib tapers in the radial direction, starting out from the rib root disposed on the can, with regard to the rib thickness or rib width defined in the circumferential direction of the can. In addition, it should be noted with respect to the rib length that it corresponds to the length of the can, with ribs extending axially with regard to the can. With ribs extending spirally or obliquely to the axis of the can, the rib length is greater than the length of the can.

Preferably, the ribs are so shaped that the side lines pass from the rib to the can in a rounded manner in order to avoid local stress peaks. A transition between the outer can surface and one of the side lines can hence preferably have at least one radius from the range of 0.1 mm to 5.0 mm. A great radius can at this point on account of an increase of the magnetic gap of adjacent stator teeth lead to a reduced efficiency of the motor. However, the loss of efficiency on the one hand may be traded for an accordingly higher pressure resistance.

Through the inventive wedge effect of the trapezoidal rib profile, the local load peaks in the can are considerably reduced. Tests have shown that for example an exemplary embodiment with ribs having a trapezoidal cross-sectional profile enables the maximum stresses occurring in the can material at an operating pressure of 150 bar in a conventional can without ribs to be reduced from approx. 270 MPa to approx. 60 MPa in the can in the region of the stator-tooth gaps. That is to say, the maximum loads are reduced by about 4.5 times. Thus, plastics may be used instead of metal for the can in pumps for high pressures.

As mentioned hereinabove, if the desired wedge effect of the rib flanks is heeded, the flank course may be designed virtually arbitrarily. Additionally, steps may also be provided in the flank course in order to additionally support the rib flanks in the stator-tooth gap. In a development, the cross-sectional profile of the ribs may for example further have at least one terminating rectangular portion with a second base line and a second roof line. The second base line and second roof line extending in the circumferential direction of the can preferably respectively have a length of 0.2 mm to 4 mm here. The second base line is then disposed on the first roof line and may be shorter such that the rectangular portion respectively forms with the trapezoidal portion at the end of each side line of the trapezoidal portion a step (gradation). In this embodiment, the total height of the rib is composed at least of a first height of a trapezoidal portion and a second height of a rectangular portion. The first height to the second height is approximately 1:1.

In the development, the additional gradation enables the stress levels occurring in the can in the region of the stator-tooth gaps to be further reduced. Tests have shown that the ribs of the development enable the maximum stresses occurring in the can material at an operating pressure of 150 bar in a conventional can without ribs to be further reduced in the region of the stator-tooth gaps from approx. 270 MPa to approx. 50 MPa in the can with the ribs. That is to say, the maximum loads are reduced by around 5.4 times.

Preferably, in the development, the side lines respectively pass from one of the side lines to the first roof line in a rounded manner. This second transition between one of the side lines and one of the roof lines preferably follows at least one radius from the range of 0.1 mm to 5.0 mm.

With regard to the dimensioning of the can, it should be noted that the wall thickness of the can as a dimensioning parameter is in principle determined by the motor dimension, hence usually being in the range of about 0.1 to 2 mm.

The further dimensioning parameters of the rib-shaped material reinforcements according to the invention are to be designed substantially with reference to the pumping pressure occurring in the interior of the can (or "can-pot", i.e. closed-end can) during operation of the motor, and may be dimensioned in relation to the wall thickness d of the can.

As dimensioning ranges for the dimensioning parameters of a rib according to the invention in relation to the wall thickness of the can, the following has been found. The rib height can amount to 1 to 20 times the wall thickness. The radii of curvature in the first and second transitions can lie in the range of 0.8 to 10 times the wall thickness. The length of the base line of the ribs can lie in the range of about 1.5 to 10 times the wall thickness. The length of the first roof line can lie in the range of 0.5 to 6 times the wall thickness. The length of the second roof line can lie in the range of about 0.4 to 4 times the wall thickness.

In a certain exemplary embodiment, the wall thickness d of the can amounts to 0.5 mm. The ribs were designed with a single trapezoidal portion, with the radii of curvature of the transitions being designed with a radius corresponding to the wall thickness, i.e. d=0.5 mm, the rib height H with three times the wall thickness, i.e. 3×d=1.5 mm, the base line of the ribs with eight times the wall thickness, i.e., 8×d=4 mm, the roof line of the ribs with four times the wall thickness, i.e. 4×=2 mm. The angle of the rib flanks was set to 30°.

The can is ideally made of a pressure-resistant and high-temperature-resistant material having a low electrical conductance, preferably less than 10E−10 S/m. Particularly preferable are fiber-reinforced plastics, for example thermoplastics or thermosetting plastics, which preferably possess an index of expansion, in particular in a temperature range of −40° C. to 120° C., similar to that of the material of the stator. Particularly suitable reinforcing fibers are glass fibers, carbon fibers, carbon nanotubes, ceramics or aramids (such as e.g. Kevlar).

Concrete examples of plastics to be mentioned here are polyphenylene sulfide with a glass-fiber content of 40% (PPS-GF40) or polyamide with a glass-fiber content of 35% (PA66-GF35). It is of course also possible to employ other pressure-resistant, high-temperature-resistant plastics having low conductance. Likewise, the filler content may be varied depending on the requirements.

The can may be manufactured, or have been manufactured, as a single part, for example as an injection-molded part. Alternatively, it is also possible to integrate the can into the stator, by molding it on, in material locking with parts of the stator, for example with a groove insulation of the stator teeth.

In principle, the individual stator teeth respectively consist of a radially directed stator tooth shank which is provided with a lead of the stator winding for wrapping. The stator tooth shank may have a stator tooth head with the appurtenant stator-tooth end face. The stator tooth head forms together with the stator tooth shank a groove for receiving a lead of the stator winding in the known manner. The stator tooth head may have two stator-tooth-head members which respectively protrude beyond the stator tooth shank in both circumferential directions of the can. Mutually opposing stator-tooth-head members of adjacent stator teeth respectively form a stator-tooth gap.

The stator as well as the internal rotor are usually respectively formed as a package of stacked, accordingly punched lamination sheets which are encased with an electrically insulating material.

According to the invention, the axial cross-sectional profile of the stator-tooth-head members is adapted complementarily to the axial cross-sectional profile of the ribs of the can. Thus, the cross-sectional profiles of the stator-tooth-head members may effectively serve as an injection-molded part for the ribs according to the invention, in the above-mentioned case where the can is manufactured by molding on or overmolding the stator with the can material.

Finally, it should be noted that the can according to the invention may also be closed at one end to form a "can-pot". Pumps in which the can is executed as a can-pot for design reasons may make use of and profit from the invention in the same measure as has been explained in connection with the embodiment as a can.

The principle of the invention is also applicable to small and fractional motors. There the air gap may amount to about 0.2 mm. The walling of the can is then configured similarly to a foil, which may be designed for high operating pressures in the region of stator-tooth gaps through the material reinforcements according to the invention.

Pump units according to the invention are particularly well suited for pumps in high-pressure applications. For example in liquid ring vacuum pumps, compressors, positive displacement pumps, hydraulic pumps, delivery pumps, or process pumps in chemical and process engineering, to mention some examples in a non-exhaustive way.

Further advantages, features and details of the invention will result from the following description, in which exemplary embodiments of the invention will be described in detail with reference to the drawings. The features mentioned in the claims and in the description may be essential to the invention individually per se or in arbitrary combination. Likewise, the hereinabove mentioned features and those specified hereinbelow may be employed each per se or in groups in arbitrary combinations. Functionally similar or identical members or components are furnished in part with the same reference signs. The terms "left", "right", "above", "below" employed in the description of the exemplary embodiments relate to the drawings as oriented with the figure designation or reference signs in the normally legible way. The shown and described embodiments are not to be understood as exhaustive, but have an exemplary character for explaining the invention. In the figures there are shown:

BRIEF DESCRIPTION OF THE DRAWINGS

FIG. 4 a detail of a second exemplary embodiment of a can according to the invention with a rib.

DETAILED DESCRIPTION

The invention will be described in detail hereinafter with reference to the figures. The detailed description serves to provide information to the person skilled in the art and is to be understood as nonrestrictive. The following description will set forth numerous specific details. It will be appreciated, however, that embodiments of the invention may also be used without these specific details. Known circuits, structures and methods will not be shown or explained in detail so as not to impede the understanding of the present description.

Figure 1:
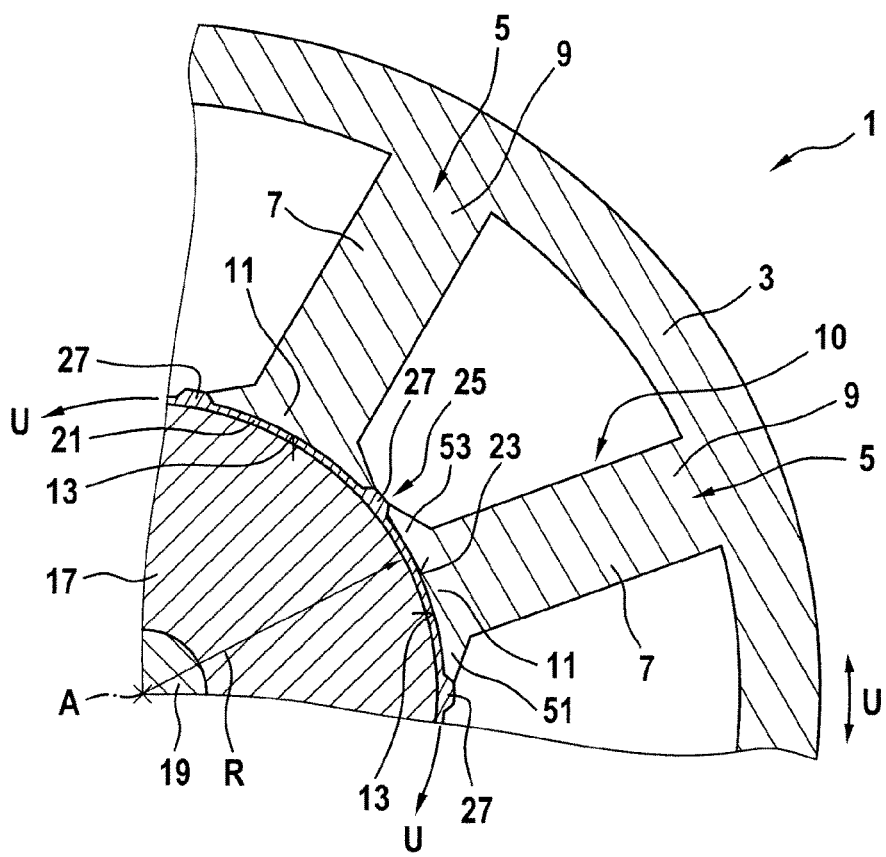
FIG. 1 a schematic cross-sectional view of a 40° segment of a canned motor having a can according to the invention.

FIG. 1 shows a schematic cross-sectional view of a 40° segment of a canned motor having a can. The schematic cross-sectional view of the 40° segment of the canned motor corresponds to a section perpendicular to the rotation axis A of the internal rotor.

A stator ring segment 3 has radially inwardly directed stator teeth 5. Each stator tooth 5 has a stator shank 7 which is directed inwardly radially starting out from a stator tooth root 9 on the stator ring segment 3. At an end of the stator shank 7 opposing the stator tooth root 9, said shank is terminated by a stator tooth head 11.

The stator teeth 5 respectively carry a lead or a plurality of leads (not shown) of a stator winding (not shown) in winding grooves 10 formed on the stator teeth 5. The winding leads may be interconnected according to the number of phases of the motor in the known manner.

The complete stator (not shown) has nine (9) of the shown stator ring segments 3. In principle, the stator 1 may also be constructed with only one 360° stator ring segment. When the stator 1 is assembled from a plurality of stator ring segments, such a stator ring segment may also have an angle other than 40°; the number of the stator ring segments for a complete stator 1, i.e. for 360°, is then accordingly smaller or greater.

Stator-tooth end faces 13 of the stator tooth heads 11 define a tubular internal space in which the internal rotor 17 is pivotally mounted on a shaft 19 as rotation axis A. The rotor 17 comprises an even number of rotor poles (not shown) on which an electrical exciter magnetic field respectively exits outwardly and interacts with a stator magnetic field exiting from the stator teeth 5 during operation and produced by an energizing of the stator windings that corresponds in the known manner.

The stator winding associated with the stator usually has a number of leads and a number of phases equal to or greater than 1. For producing the exciter magnetic field, the internal rotor 17 may have for example permanent magnets (not shown) which are disposed in pockets provided therefor (not shown).

The motor in the exemplary embodiment may be for example an EC motor (electronically commutated motor), e.g. a BLDC motor (brushless direct current motor) as the drive for a pump for a pumping pressure of 150 bar. For this purpose, winding ends (not shown) of the stator winding are attached in the known manner for the brushless embodiment of the motor to a commutating electronics which is arranged to produce a rotating field or alternating field through power-electronic switches. The application is of course not restricted to EC motors.

The interaction of the stator magnetic field and of the exciter magnetic field of the internal rotor 17 leads, during operation of the motor, to a drive torque which acts on the internal rotor 17 and provides a torque on the shaft 19. During operation of the motor, the internal rotor 17 located on the shaft 19, in the can 21 filled with a pumped fluid medium, rotates one or more impellers of the pump for pumping the pumped medium. Since the internal rotor 17 is in contact with the pumped medium, such motors are designated wet-rotor motors.

Both the stator and the internal rotor 17 may in principle be constructed from solid material (monolithically), but are usually respectively assembled from a plurality of mutually electrically insulated lamination sheets made of punched electrical sheet. Preferably, stator and internal rotor 17 are constructed in stacked form as lamination packages consisting of individual mutually electrically insulated lamination sheets, with the latter lying one over the other substantially congruently. That is to say, for the stator the lamination sheets are so disposed on each other that the lamination sheets forming the stator teeth 5 lie one over the other in the axial direction, i.e. in the direction of the rotation axis A of the shaft 19, so that their outer edges extend in the axial direction, i.e. parallel to the rotation axis A of the shaft 19. Accordingly, the lamination sheets for the lamination package forming the rotor 17 are so disposed on each other that the above-mentioned pocket recesses in the sheet laminations forming the pockets come to lie one over the other in the axial direction.

The space in the stator in which the stator windings are disposed and the space in which the internal rotor 17 is disposed are mutually separated fluid-tightly by a can 21 preferably made of a non-electroconductive material, in the exemplary embodiment a plastic. Cans made of non-electroconductive material, such as plastic, have the advantage that they do not influence or disturb the magnetic flux between stator and internal rotor 17. The can 21 is made of one of the above-mentioned pressure-resistant and likewise high-temperature-resistant plastics, e.g. polyphenylene sulfide with a glass-fiber content of 40% (PPS-GF40).

The can 21 is so dimensioned that it lies against the inner side of the stator, more precisely, against the stator-tooth end faces 13 of the stator teeth 5. Thus it is supported by the stator teeth 5 against internal pressures in the rotor space during operation. Hence, the can 21 may be configured with a small wall thickness in these regions. In the exemplary embodiment, the wall thickness d of the can 21 amounts to about 0.5 mm.

On the can 21 there are ribs 27 disposed on the surface 23 facing the stator ring segment 3. The ribs 27 are part of the can 21, i.e. the can 21 is configured in one piece with the ribs 27.

The ribs 27 are so shaped that they fit in a form-locking manner into stator-tooth gaps 25 respectively formed by two mutually adjacent stator teeth 5. To achieve the wedge effect, the ribs 27 taper in the radial direction away from the can 21, i.e. outwardly, starting out from the rib root 29 disposed on the can 21 (see FIGS. 3 and 4), with regard to a rib thickness defined in the circumferential direction U of the can 21. In the total stator-tooth gap 25 the ribs 27 are in contact with the respective stator teeth in order to transfer compressive forces from the can 21 to the stator teeth 5 as bearing points for relieving the can 21.

The height H of the ribs 27 (27a in FIG. 3) starting out from the rib root 29 (see FIG. 3) is greater than the wall thickness d of the can 21. In the shown exemplary embodiment, the ribs 27 are configured with a height H of approx 1.5 mm (i.e. 3×d).

Figure 2:
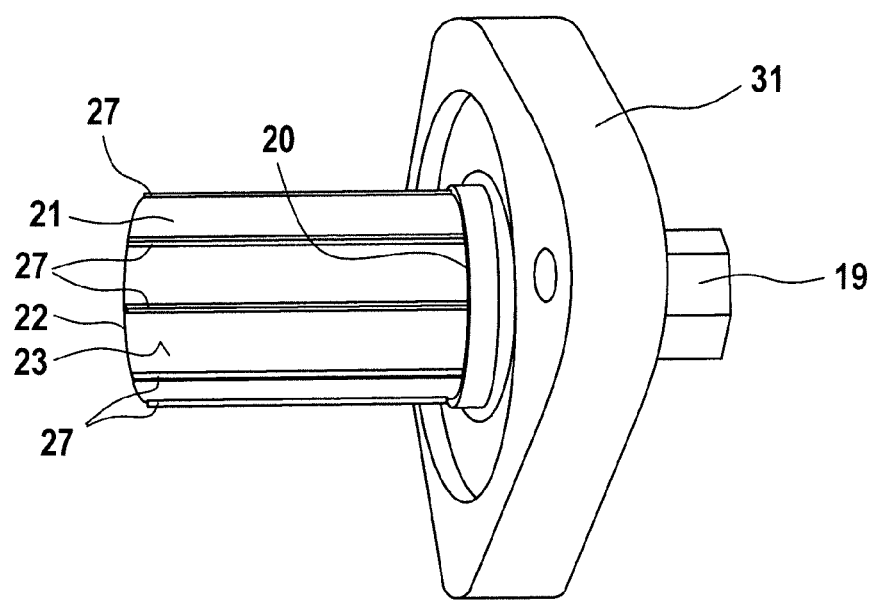
FIG. 2 a perspective view of an exemplary embodiment of the can according to the invention with ribs.

FIG. 2 shows a perspective view of the exemplary embodiment of the can 21 with the ribs 27. In this representation the can 21 is located on the internal rotor 17. The stator formed from the nine 40° stator ring segments 3 is not shown. At the right end 20 of the can 21 there is a motor flange 31 to which the can 21 is connected fluid-tightly, for example by using an O ring seal. When the motor is complete, the motor flange 31 has flange-mounted thereon the stator with a stator housing (not shown). On the can 21 one can readily see the ribs 27 extending equidistantly and mutually parallel in this exemplary embodiment. At the right end 20 there is located besides the flange 31 an end of the shaft 19 (FIG. 1), to which an impeller of the pump may be attached for example.

At the end 22 opposing the motor flange 31 the can 21 is also connected fluid-tightly, for example again by means of an O ring seal, so that the internal rotor 17 is disposed within the pumped medium during operation and the stator is shielded from the pumped medium by the can. In motors having a can 21 the pumped medium is usually pumped past the internal rotor 17 and through the can 21.

In an alternative embodiment, the can 21 may also be closed at the end 22 opposing the motor flange 31 to form a "can-pot" (not shown). Preferably, such a can-pot is configured in one piece, i.e. a cover closing the can to form the can-pot may in principle be joined fluid-tightly to the can 21 for example by bonding or material locking by friction welding, but is preferably made of the same material as the can and is connected thereto in a material-locking manner. That is to say, a can-pot is preferably configured as a one-pieced element.

It should be noted that the rib-shaped material reinforcements (ribs 27) need not necessarily extend parallel and straight in the axial direction on the can 21 or can-pot. For example, the stator-tooth gaps may also extend spirally on a stator. Likewise, the stator-tooth gaps can extend straight, but obliquely to the can axis.

The rib-shaped material reinforcements are configured on the can 21 or can-pot complementarily and in a form-locking manner with regard to the stator-tooth gaps 25 and are molded on the can 21 or can-pot accordingly. In other words, a can-pot may obtain the same effects and thus advantages by means of the material reinforcements as has been explained in connection with the can.

If the can 21 is manufactured by molding on or overmolding the stator, the complementary configuration of the ribs 27 with regard to the stator-tooth gaps 25 results virtually automatically. In this case there are also no restrictions in terms of the design of the axial course of the stator-tooth gaps 25, since the can 21 need not be configured so as to be insertable into the stator as a separate part.

Figure 3:
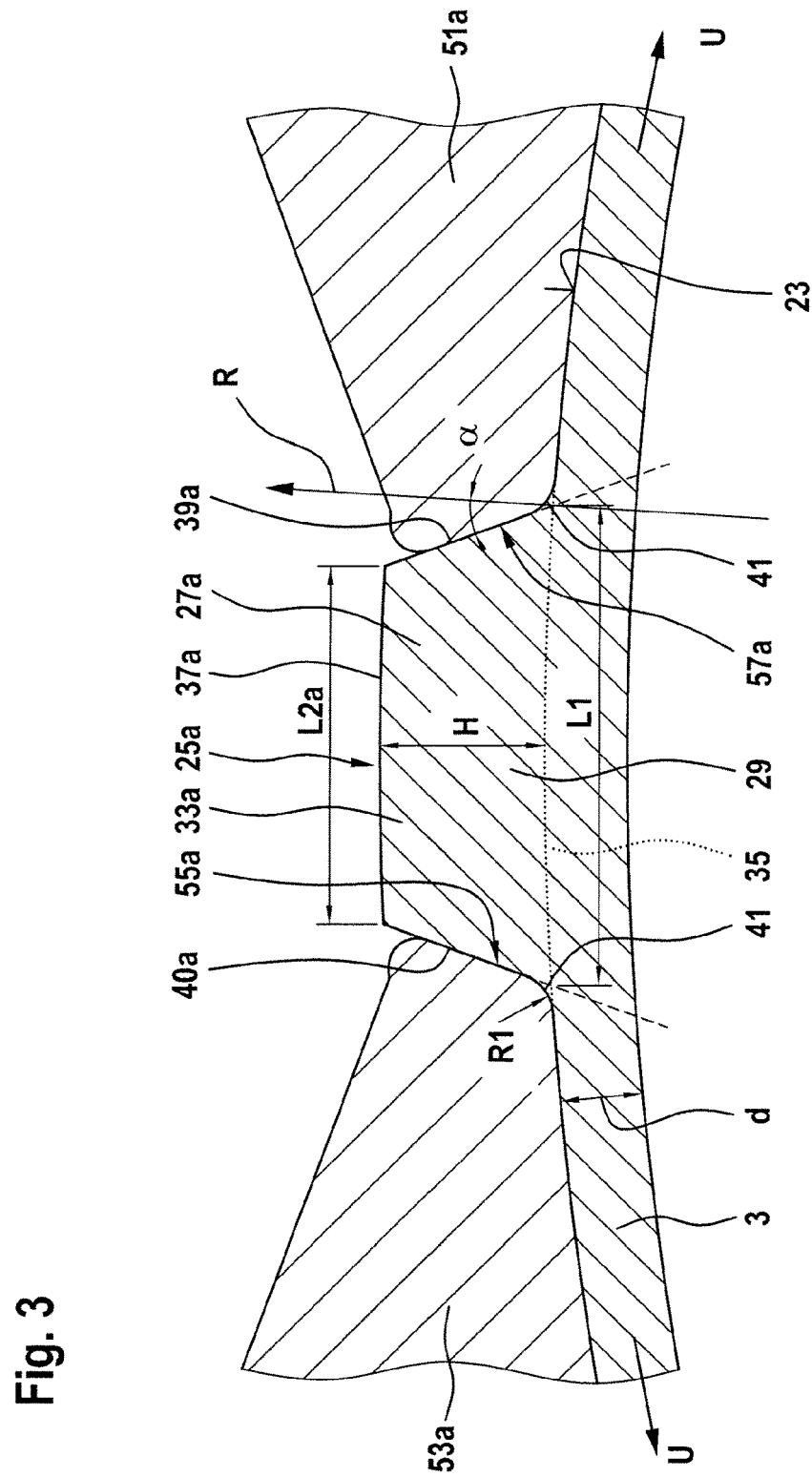
FIG. 3 a detail of a first exemplary embodiment of a can according to the invention with a rib.

FIG. 3 shows a detail of a first exemplary embodiment of a can 21 with one of the ribs 27a. The form of the ribs 27a corresponds to the form of the ribs 27 in FIGS. 1 and 2.

The cross-sectional profile of the shown rib 27a is defined substantially by a trapezoidal portion 33a having a first base line 35 and a first roof line 37a. Since the rib 27a configured with a trapezoidal cross-sectional profile tapers radially outward, starting out from the rib root 29, with regard to the rib width defined in the circumferential direction U of the can 21, the rib 27a is inserted into the stator-tooth gap 25a like a wedge. Under pressure load from the interior of the can 21 during operation, this wedge effect of the rib 27a prevents an overloading of the can 21 and obtains an additional support of the can 21 in the stator-tooth gap 25a on the stator teeth as bearing points.

The first base line 35 lying against the can 21 and extending in the circumferential direction U of the can 21 possesses a first length L1 of approx. 3 mm (i.e. approx. 6×d). The first roof line 37a disposed in the stator-tooth gap 25a is configured with a shorter second length L2a of approx. 2 mm (i.e. approx. 4×d).

The cross-sectional profile of the trapezoidal portion 33a of the rib 27a is further determined in the circumferential direction U on the left and right by two side lines 39a and 40a extending mutually symmetrically and substantially straight. The side lines 39a and 40a respectively extend at an angle α of 20 degrees with regard to the radius R of the can 21 such that the rib 27a tapers radially away from the can 21, and the rib 27a is inserted like a wedge into the stator-tooth gap 25a which is formed by the circumferentially mutually opposing stator-head members 51a, 53a.

The side lines 39a, 40a extend from the rib 27a into the can 21, or vice versa, in a rounded manner. A transition 41 between the outer can surface 23 and a respective one of the right side line 39a and left side line 40b is preferably of concave configuration with at least one radius in the range of 0.1 mm to 5.0 mm. In this exemplary embodiment, the transition 41 has a radius of 0.5 mm (i.e. R1=d).

Due to the fact that the rib 27a is fitted into the stator-tooth gaps 25a in a wedge shape, expansions of the can 21 under pressure load are distributed over the flanks 55a, 57a of the stator-head members 51a, 53a. That is to say, the expansions of the can 21 are transmitted around the contour of the stator-tooth-head members 51a, 53a virtually continuously as bending stresses, so that an overloading of the material of the can 21 is avoided. As a result, the can 21 made of a plastic is suitable for high-pressure pump units in spite of its thin-walled configuration.

FIG. 4 shows a detail of a second exemplary embodiment of a can 21 with a rib 27b. The ribs 27b are a development of the principle of the ribs 27, 27a of the exemplary embodiment of FIGS. 1 to 3.

The cross-sectional profile of the rib 27b still has a trapezoidal portion 33a, similarly to the rib 27a in FIG. 3. However, the trapezoidal portion 33a is configured with a smaller height H1 in comparison to the height H of the rib 27a. The height H1 amounts in this exemplary embodiment to about 0.5 mm (i.e. H1=d). Hence, the two side lines 39b and 40b located on the left and right in the circumferential direction U and extending mutually symmetrically and substantially straight are also configured somewhat steeper. That is to say, in the rib 27b the side lines 39b and 40b respectively extend at an angle α of about 20 degrees with regard to the radius R of the can 21.

The trapezoidal portion 33a of the rib 27b also tapers radially away from the can 21, so that the rib 27b is likewise inserted in the portion 33a like a wedge into the stator-tooth gap 25b which is formed by the circumferentially mutually opposing stator-head members 51b, 53b.

The cross-sectional profile of the ribs 27b additionally has in comparison to the rib 27a of FIG. 3 a rectangular portion 33b having a second base line 43 and a second roof line 45. The side lines of the portion 33b which extend in the circumferential direction U of the can 21, i.e. the second base line 43 and second roof line 45, are substantially equally long with a respective length L3 of 0.75 mm (i.e. 1.5×d). The height of the rectangular portion 33b in this exemplary embodiment amounts to about 1.8 mm (i.e. 3.6×d).

The sum of the heights H1 and H2 yields 2.55 mm as the height H of the rib 27b.

The second base line 43 directly adjoins the first roof line 37b or is congruent therewith in the common region. Compared with the first roof line 37a, the second base line 43 is shorter such that the rectangular portion 33b respectively forms with the trapezoidal portion 33a a step 47 at the end of each side line 39b, 40b.

The side lines 39b, 40b respectively pass into the first roof line 37b in a rounded manner in order to avoid local load peaks. A second transition 49 between a respective one of the side lines 39b, 40b and the first roof line 37b is configured with at least one radius R3 from the range of 0.1 mm to 5.0 mm. In this exemplary embodiment, the transition 49 has a radius of 0.5 mm.

Due to the fact that the rib 27b is fitted with the trapezoidal portion 33a into the stator-tooth gap 25b in a wedge shape, expansions of the can 21 under pressure load are distributed over the flanks of the stator-head members 51b, 53b, as with the rib 27a of FIG. 3. That is to say, the expansions of the can 21 are transmitted around the contour of the stator-tooth-head members 51b, 53b virtually continuously as bending stresses, so that an overloading of the material of the can 21 is avoided.

In the rib 27b, the steps 47 of the trapezoidal portion additionally rest on projections 59 which are provided on the stator-head members 51b, 53b.

It has turned out that the decrease in the height H1 of the trapezoidal portion 33a compared with the height H in the rib 27a of FIG. 3 reduces the effective wedge area of the portion 33a. Through the additional steps 49 which are supported on the projections 59 of the stator-head members 51b, 53b, the load peaks occurring in the stress pattern of the rib 27b are distributed over the first transitions 49 and the steps 47. As a result, the maximum stress in the can 21 occurring in the region of the stator-tooth gaps 25b may thus be reduced further. That is to say, the can 21 is suitable for even higher pressure load at the same wall thickness and rib height.

As a result, a can 21 made of a plastic is suitable for high-pressure pump units on account of the ribs 27, 27a, or 27b in spite of its thin-walled configuration.

As already noted above, the can described hereinabove with reference to the exemplary embodiments may also be closed at one end to form a can-pot. Such a can-pot is usually found in pumps in which the pumped medium does not flow past the internal rotor during operation of the pump. A can-pot may make use of and profit from the proposed improvements in connection with a can in the same measure as was explained in connection with the embodiment as a can.

The invention claimed is:

1. A pump comprising:
a canned motor having a stator with an internal rotor disposed in the stator,
wherein the stator and the internal rotor are mutually separated, fluid-tightly, by a can formed from a non-metal material which is disposed between the stator and the internal rotor,
wherein the stator has stator teeth which extend radially in the direction of the internal rotor and define with appurtenant stator-tooth end faces a receiving space for the internal rotor and the can,
wherein the can lies against the stator-tooth end faces and has ribs on its surface that face the stator, and are arranged in stator-tooth gaps which are respectively defined by two mutually adjacent stator teeth,
wherein the ribs are fitted in the stator-tooth gaps in a form-locking manner and taper in the radial direction, starting out from a rib root that is disposed on the can, with regard to a thickness of the ribs, said thickness being defined in the circumferential direction of the can,
wherein each stator tooth consists respectively of a stator tooth shank and a stator tooth head having two stator-tooth-head members which respectively protrude beyond the stator tooth shank in both circumferential directions of the can,
wherein rib flanks formed by side lines of the ribs are respectively in contact, over the region of the height of the ribs, with a contour of the stator-tooth-head members which are shaped complementarily to the side lines, as bearing points fixed against shearing-off,
wherein the stator-tooth contour and thus the height of the ribs is so designed that equivalent stresses in the can are always smaller than the breaking point of the can material in the total region of the can under operating pressure load;
wherein a cross-sectional profile of the ribs has at least one trapezoidal portion with a base line and a roof line, wherein the base line lying against the can and extending in the circumferential direction of the can, and the roof line is disposed in the stator-tooth gap;
wherein the cross-sectional profile of the trapezoidal portion is further determined by the two side lines extending mutually symmetrically and substantially straight, wherein the side lines extend respectively at an angle in the range of 5° to 60° with regard to the radius of the can; and
wherein the side lines pass from the rib into the can in a rounded manner, wherein a first transition between the outer can surface and one of the side lines follows at least one radius from the range of 0.8 to 10 times the wall thickness of the can.

2. The pump according to claim 1, wherein the height of the ribs starting out from the rib root is greater than the wall thickness of the can.

3. The pump according to claim 2, wherein:
the can has a wall thickness of 0.1 mm to 2 mm, or
the ribs have a height corresponding to 1 to 10 times the wall thickness of the can.

4. The pump according to claim 1, wherein
the base line lying against the can and extending in the circumferential direction of the can has a first length of 4.5 to 10 times the wall thickness of the can, and the roof line disposed in the stator-tooth gap has a shorter second length of 0.5 to 6 times the wall thickness of the can.

5. The pump according to claim 1, wherein the at least one cross-sectional profile of the ribs further has at least one rectangular portion with a second base line and a second roof line.

6. The pump according to claim 5, wherein the second base line lies on the first roof line and is shorter such that the rectangular portion forms with the trapezoidal portion a step at the end of each side line.

7. The pump according to claim 6, wherein the side lines respectively pass from one of the side lines into the roof line in a rounded manner.

8. The pump according to claim 7, wherein a second transition between one of the side lines and the first roof line follows a radius from the range of 0.8 to 10 times the wall thickness of the can.

9. The pump according to claim 5, wherein the second base line and second roof line extending in the circumferential direction of the can respectively have a length of 0.4 to 8 times the wall thickness of the can.

10. The pump according to claim 1, wherein the can is made of a pressure-resistant and high-temperature-resistant material having low electrical conductance, less than 10E−10 S/m.

11. The pump according to claim 10, wherein the can is made of a plastic.

12. The pump according to claim 11, wherein the plastic is fiber reinforced.

13. The pump according to claim 11, wherein the plastic is fiber reinforced and has an index of expansion, in a temperature range of 40° C. to 120° C., similar to that of the material of the stator.

14. The pump according to claim 1, wherein the can is configured as a single part separate from the pump.

15. The pump according to claim 1, wherein the can is closed at one end fluid-tightly in a material-locking manner, to form a can-pot.

* * * * *